United States Patent [19]

Boutle

[11] 4,242,464

[45] * Dec. 30, 1980

[54] PRODUCTION OF POROUS MATERIALS

[75] Inventor: David L. Boutle, Malden, England

[73] Assignee: Poryair Limited, Norfolk, England

[*] Notice: The portion of the term of this patent subsequent to Jun. 5, 1996, has been disclaimed.

[21] Appl. No.: 41,761

[22] Filed: May 23, 1979

Related U.S. Application Data

[63] Continuation of Ser. No. 201,295, Nov. 23, 1971, Pat. No. 4,157,424.

[30] Foreign Application Priority Data

Aug. 13, 1964 [GB] United Kingdom ............... 33047/64

[51] Int. Cl.³ .............................................. B29D 27/04

[52] U.S. Cl. .................................... 521/61; 264/45.8; 264/49; 264/DIG. 13

[58] Field of Search .......... 264/41, 45.8, 49, DIG. 13; 210/500 M

[56] References Cited

U.S. PATENT DOCUMENTS 4,157,424  6/1979  Boutle ................................ 264/41 X Primary Examiner—Philip Anderson
Attorney, Agent, or Firm—Watson, Cole, Grindle & Watson

[57] ABSTRACT

An improved microporous polymer material is made by coagulating, e.g. in water, a polymer solution containing dispersed microscopic particles of a removable filler soluble in a coagulating liquid.

13 Claims, 3 Drawing Figures

PRODUCTION OF POROUS MATERIALS

This is a continuation of application Ser. No. 201,295 filed Nov. 23, 1971 now U.S. Pat. No. 4,157,424 issued June 5, 1979.

The present invention relates to a method of making porous materials such as microporous plastic materials.

According to the present invention a method of making a microporous polymeric plastics material comprises (a) forming a mixture comprising a solution of at least one synthetic polymeric plastics working material in an organic solvent, the said solution having evenly distributed through it microscopic particles of a removable filler, (b) shaping the mixture, and (c) solidifying said polymeric plastics by the action of a non-solvent therefor, which is miscible with the organic solvent, and leaching out said microscopic particles of the removable filler to leave the working material in a microporous solid form.

Preferably the following general solubility relationships between the various components may exist. The working material should be substantially soluble in the solvent but substantially insoluble in all the leaching agents; the removable filler should be substantially insoluble in the working material, should be substantially insoluble in the solvent, and should be substantially soluble in at least one of the leaching agents, the removable filler leaching agent; and at least one of the leaching agents, the solvent leaching agent, should be at least substantially miscible with the solvent. Conveniently the removable filler is substantially soluble in the solvent leaching agent which is also used as the removable filler leaching agent.

Preferably the proportion of working material to solvent in the mixture is in the range of 10 to 70% of working material by weight.

It will be appreciated that the invention is not limited to the specific ingredients mentioned in the examples which follow. Thus provided the general solubility relationships mentioned above are substantially fulfilled, a wide variety of materials can be used.

Thus the working material may comprise at least one of the following materials, plasticised polyvinyl chloride, a copolymer of vinyl chloride and vinylidene chloride or vinylacetate, a butadiene-styrene copolymer, a polyester, a polyamide for example nylon, a polyesteramide, a polyvinyl formal, a polyvinyl alcohol, a polyacrylate for example polymethyl methacrylate, or a polystyrene.

The working material may also comprise a polyurethane.

The term polyurethane is to be understood in its broadest sense and includes any material derived from the reaction, or a reaction product of a reaction, between an isocyanate such as a di-isocyanate and a molecule, which will be called the polyurethane precursor, containing at least two groups, such as hydroxyl, amido or amine groups, which contain hydrogen atoms capable of reaction with an isocyanate group. The polyurethane precursor should generally be polymeric for example a polyester derivative or a polyether diol, or a polyester amide.

The precursor may be reacted with an excess of a di-isocyanate to produce a polyurethane having a comparatively low molecular weight, for example of the order of 10,000, which will be called a polyurethane prepolymer, and which has isocyanate end groups. The prepolymer may then be chain-extended by reaction with a chain extending agent, for example a low molecular weight glycol (to produce a polyurethane polyurethane containing urethane linkages (—N—H—CO—O—)), or a low molecular weight diamine (to produce a polyurea polyurethane containing urea linkages (—NH—CO—NH—)).

These chain extended prepolymers may finally be cured. The curing process is believed to involve cross-linking and chain branching reactions between the unreacted isocyanate end groups and the active hydrogen containing groups in the polyurethane prepolymer chain.

The degree of cross-linking and chain branching may be controlled by varying the ratio of isocyanate groups to total active hydrogen containing groups and/or by the addition to the polymer during the curing stage of a molecule containing three groups containing active hydrogen, for example, a triol.

An increase in the degree of cross-linking modifies the plastic properties of the polyurethane producing a tendency for it to be thermosetting rather than thermoplastic. In certain applications of the present invention for example those relating to the production of a synthetic leather it is desired that the polyurethane should have thermoplastic properties.

Thus the polyurethane precursor, the di-isocyanate, and the chain extending agent may be chosen to minimise any further reaction, for example cross linking or chain branching or the like, which could occur during any curing stage of the polyurethane.

For such uses the polyurethane is preferably a thermoplastic elastomer having a low degree of cross linking, and thus may be a predominantly linear polymer. The polyurethane may have a molecular weight in the range 20,000–300,000.

The working material may be a polyurethane derived from a polyester, for example the proprietary material supplied by the B. F. Goodrich Chemical Company under the name ESTANE, or the proprietary material supplied by Elastomer Products Limited (Elastollan Limited) under the name ELASTOLLAN. An example of another polyurethane suitable also as a thermoplastic working material is the proprietary polyurethane material supplied by Monsanto Chemicals Limited under the name TEXIN.

The removable particulate filler may be a material having a substantial number of particles having a diameter less than 100 microns. Preferably the removable particulate filler is a material having a substantial number of particles whose diameters fall within the range 7–25 microns.

The invention is not dependent upon any particular theory but it is believed that the addition of the leaching agent reduces the solubility of the working material in the solvent thus causing the working material to solidify. The presence of a solid filler dispersed through the working material appears to result in rapid and even solidification of the working material with substantially no inclusion of solvent or encapsulation of the removable filler and results in a substantially uniform pore structure.

Conveniently the removable particulate filler is water soluble, and is for example, a sugar or a salt.

The salt may be an inorganic salt for example sodium chloride or sodium sulphate.

However, other leaching agents and removable fillers may be used. Thus in another form of the present invention the removal of the removable filler from the mixture may involve chemical action by at least one of the leaching agents or chemical action by a substance included in at least one of the leaching agents on the removable filler so as to make it removable.

As an example the removable filler may be an insoluble salt of a weak acid, for example calcium carbonate, and at least one of the leaching agents may include an acid, for example hydrochloric acid, which forms a soluble salt with the cation in the removable filler. Alternatively the removable filler may be an amphoteric metal salt, for example aluminium oxide, and the leaching agent may include an alkali, for example sodium hydroxide, in sufficient concentration to dissolve the amphoteric metal salt.

The proportion of removable filler to working material may be in the range in parts by weight of 0.5 parts to 6 parts of removable filler to 1 part of working material.

The solvent leaching agent may comprise water or methanol and the removable filler leaching agent may also comprise water.

The formation of the porous body by exposure to leaching agents may be effected by at least four different methods.

The choice of method may depend on a variety of factors such as simplicity of the process, economic factors such as ease of solvent and/or removable filler material recovery, solubility relationships between the materials in the mixture and/or the physical properties of the materials in the mixture.

Thus in the simplest method the exposure of the mixture to leaching agents is effected in one stage and a single leaching agent, the solvent and filler leaching agent, is used to remove the solvent and the removable filler, to form a porous body. As an example of this method the mixture may include a polyurethane, dimethyl formamide and sodium chloride, and the solvent and filler leaching agent may be water and removes the solvent, dimethyl formamide, and the removable particulate filler, sodium chloride.

Alternatively, for example in order to aid solvent recovery the exposure of the same mixture to leaching agents may be effected in two stages, a first stage consisting of the solvent being substantially removed by the solvent leaching agent, for example methanol and a second stage consisting of the removable filler being removed by the removable filler leaching agent, for example water.

As a further alternative, for example when the solubility relationships of the solvent and the removable filler require that two different leaching agents be used, the exposure of the mixture to leaching agents may also be effected in one stage, the mixed leaching agent one-stage method, or in two stages in at least one of which the leaching agent is a mixture of solvent and filler leaching agents.

In the case of the mixed leaching agent one-stage method a mixture of a solvent leaching agent and a removable filler leaching agent may be used. As an example the mixture may include a vinyl chloride vinylidene chloride copolymer, cyclohexanone and sodium chloride, and the leaching agent may be a mixture of a solvent leaching agent, methanol, and a removable filler leaching agent, water.

It will be appreciated that in the mixed leaching agent one-stage method the solvent leaching agent and the removable filler leaching agent should be miscible.

The exposure to leaching agents may be effected by immersing the shaped mixture including solvent, working material and removable filler in the respective leaching agent.

According to another form of the present invention the mixture may also include a surface active agent. The surface active agent is preferably insoluble in the leaching agents used and is preferably capable of withstanding the working conditions and the working temperatures and pressures involved without undergoing any substantial chemical degradation, so as to remain in an active state in substantial proportions in the finished porous body.

The surface active agent may affect the ability of the porous body to become wetted by liquids, either being a wetting agent to render it hydrophilic or wettable, or a proofing agent to render it hydrophobic or water repellant. Alternatively or in addition the agent may serve to modify the porous structure of the porous body for example to modify its water vapour permeability and/or its pore size.

Where the agent is relied on to modify wettability it will, of course, be necessary that a sufficient amount of the agent should remain in the finished material.

The invention is applicable to the production of hydrophilic microporous sheet material for various purposes, for example artificial leather for the lining of shoes.

For such purposes the wetting agent may be inert and insoluble with regard to the substances with which it will be in contact and in particular should be capable of making the material hydrophilic at pHs of about 6 to 9.

A suitable wetting agent for shoe linings may comprise an alkali metal salt of a sulphonated or sulphated derivative of a substituted long chain aliphatic dicarboxylic acid, for example a bis-alkyl sulphonated dicarboxylic acid and in particular a sodium salt of a bis-alkyl sulpho-succinate, for example one in which the alkyl groups are the isobutyl, methylamyl, octyl, nonyl or tridecyl groups.

Examples of such suitable agents for use in particular in connection with shoe linings are the proprietary materials sold under the name Manoxol, for example Manoxol IB, MA, OT, N or TR.

The invention is also applicable to the production of hydrophobic microporous sheet material for various purposes, for example artificial leather for the outers of shoes and for general upholstery purposes.

Once more the surface active agent must be insert and insoluble with regard to the substances with which it will be in contact while at the same time imparting hydrophobic or water repellancy properties to the material.

A suitable proofing agent for shoe outers may comprise a long chain polymer of dialkyl or aryl alkyl siloxane units, for example, a silicone resin. A particular example of a suitable proofing agent comprises a white spirit solution containing a silicone resin (approximately 50% by weight of solids), for example a proprietary material sold under the name Silicone M492. Another suitable proofing agent is one having the same composition as the proprietary material sold under the name of Silicone R 205.

Conveniently the surface active agent is mixed with the solvent for the working material so as to be distributed throughout the mixture.

The surface active agent may also be selected to have an effect on the porous structure of the porous body.

Thus the surface active agent may serve to modify the porous structure of the porous body for example to modify its water vapour permeability and/or its pore size.

Preferably the surface active agent is selected to decrease the average pore size or to increase the water vapour permeability and in particular to do both.

Both types of surface active agent mentioned above have some effect on the porous structure of the porous body. Hence for this purpose the surface active agent may comprise an alkali metal salt of a sulphonated or sulphated derivative of a substituted long chain aliphatic dicarboxylic acid, or a long chain polymer of dialkyl or aryl alkyl siloxane units.

In particular any of the proprietary materials mentioned above as surface active agents may be used to produce a desired modification in properties depending on the particular use to which the finished article is to be put.

However, it has been found that the Manoxols and in particular Manoxol N and TR result in a marked increase in the water vapour permeability of the finished porous body.

Silicone M492 and Manoxol N and TR are preferred and may be used when a material having an increased water vapour permeability is desired. Such articles on the one hand include shoe uppers, rain wear and bandage material where water repellancy is also required, and on the other hand shoe linings where wettability is also required.

Thus in the production of a hydrophilic porous body a material comprising a sodium salt of a bis-alkyl sulpho-succinate may be selected as the wetting agent, and the alkyl groups are preferably the nonyl or tridecyl groups.

In the production of a hydrophilic porous body a material comprising a white spirit solution containing a silicone resin (approximately 50% by weight of solids), for example the proprietary material sold under the name Silicone M492, may be selected as the proofing agent.

The word shaping is to be understood in its broadest sense and includes all the following processes. Thus the shaping of the mixture includes impregnating a permanent support with the mixture, or moulding the mixture, onto a temporary or permanent support, or passing the mixture through calender rolls in the presence of a temporary or permanent support, or extruding the mixture through a suitable die onto a temporary or permanent support, or spreading, casting or spraying the mixture onto a temporary support or permanent support.

It will be appreciated that the various shaping processes given above require mixtures of suitable viscosities, and the viscosity of the mixture may be adjusted by varying the amount of solvent in the mixture. Thus if the mixture is to be shaped by moulding, calendering or extruding the amount of solvent may be adjusted to give the mixture a dough-like consistency. If the mixture is to be shaped by impregnating a permanent support, or spreading, casting or spraying on a temporary or permanent support the amount of solvent may be adjusted to give the mixture a consistency similar to that of ordinary paint.

The temporary support may be a stainless steel conveyor or a sheet of solvent resistant synthetic plastics material.

The temporary support or permanent support may be previously shaped to a desired configuration, for example a glove shape.

It will be appreciated that the present invention can be used to form a porous or microporous layer of working material on any suitable permanent support.

Thus the support may be a permanent support comprising a plastics materials, for example a porous synthetic plastics material. Alternatively the support may be a permanent support comprising a material derived from fibres.

The fibres of the permanent fibrous support may be natural or synthetic or a mixture of natural and synthetic fibres. Thus the permanent fibrous support may be a paper, or a woven, knitted or non-woven textile material, for example a felt.

Preferably the felt is made by mechanically entangling staple fibres.

The fibres of the permanent fibrous support may comprise nylon or polyethylene terephthallate fibres or polypropylene fibres or mixtures thereof.

Felts impregnated by the method according to the present invention may find uses in the production of synthetic leather materials.

In particular in connection with the production of synthetic leather materials the felt may have a density of not less than 0.07 grm. per cc., and preferably not less than 0.18 grm. per cc.

Published microscopic studies have indicated that natural leather can be considered as essentially consisting of two zones, an inner zone which has been called the main fibre structure, and a surface zone which has been called the grain layer.

A synthetic leather may also conveniently comprise a zone at least partially simulating the grain layer of natural leather to a greater or lesser degree, which zone for the purposes of this specification will be called the surface zone, and a zone at least partially simulating the main fibre structure of natural leather to a greater or lesser degree, which zone for the purposes of this specification will be called the fibrous base zone.

It will be appreciated that the present invention may conveniently be used to prepare a fibrous base zone by impregnating a felt as described above. It will also be appreciated that the present invention may conveniently be used to form a surface zone on any suitable fibrous base zone by a suitable method such as coating a suitably prepared surface of a suitable fibrous base zone, such as one prepared by the present invention.

A porous material suitable for use in particular as a fibrous base zone may be made according to the present invention by a method which comprises forming a mixture including at least one natural or synthetic polymeric material, the working material, and a removable filler ground to a particle size range of 7–25 microns, and a solvent for the working material, and impregnating a felt, made by mechanically entangling staple nylon fibres, and having a density in the range 0.07 to 0.18 grms per cc., with the said mixture, the solvent being chosen so as not to be a significant solvent for the removable filler or a substantial solvent for nylon, and removing the solvent and the removable filler by exposing the impregnated felt to at least one leaching agent which is not a solvent for the working material or nylon.

The ratio of working material to felt in the finished product may be in the range of ratios by weight of 0.3 to 1 to 1.5 to 1, depending on the actual use to which the finished product is to be put. For a fibrous base zone the ratio of working material to felt in the finished product may be in the range of ratios by weight of 0.3 to 1 to 0.8 to 1.

Any of the working materials specifically mentioned above may be used but a polyurethane is preferred, and the proprietary materials mentioned above are particularly suitable. The following solvents, tetrahyrofurah, N-methyl pyrrolidone, dimethyl sulphoxide, or dimethyl formamide may be used as solvents for one or more of the proprietary materials sold under the names Estane, Elastollan and Texin. Water may be used as the leaching agent.

The surface of the fibrous base zone is preferably prepared so as to be substantially smooth. This preparation may involve slitting the fibrous base zone parallel to its major plane, for example with a band knife.

According to a further form of the present invention a composite material suitable for use as a replacement upper material for making footwear may comprise a fibrous base zone, for example, in the form of a sheet, having a surface zone formed on each face. Each face may be treated to give it a substantially smooth surface. As indicated above this treatment may involve slitting the fibrous base zone parallel to its major plane, for example with a band knife.

It will be appreciated that the present invention may conveniently be used to prepare both the fibrous base zone and the two surface zones.

The two surface working materials may be different and may have different surface properties with regard to water, for example one surface may be hydrophobic thus providing a surface having properties suitable for a shoe outer leather, and the other surface may be hydrophilic thus providing a surface having properties suitable for a shoe lining leather. Such a composite material may replace both the lining and the outer leather.

The hydrophobic surface may conveniently contain a proofing agent such as the proprietary material sold under the name Silicone M492 and the hydrophilic surface may contain a wetting agent such as the proprietary material sold under the name Manoxol TR.

Such a material has the advantage that moisture liberated by the foot is absorbed by the surface in contact with the foot and can readily escape to the atmosphere through the surface zone as vapour, whereas liquid water outside the shoe is repelled.

It will be appreciated that a fibrous base zone or a synthetic leather comprising a surface zone and a fibrous base zone made in accordance with the present invention may be treated by any of the known techniques, such as grinding or abrading to produce a suede like finish or lacquering to produce a gloss finish.

The invention may be put into practice in various ways but certain specific embodiments will be described in the following examples 1 to 12, some of which are as applied to the manufacture of a synthetic leather.

In the examples all parts are given in parts by weight.

In examples 1 to 12, the removable particulate filler is sodium chloride ground to a particle size range of 7–25 microns.

FELTS

The felts are made from nylon fibres by mechanical entangling. Felt A weighs 350 grams per sq. meter and has an average thickness of 5 millimeters and thus a density of 0.07 grm. per cc. Felt B weighs 450 grams per sq. meter and has an average thickness of 2.5 millimeters and thus a density of 0.18 grm. per cc. Either of these felts may be used in the examples as desired.

It will be appreciated that there are five different leaching methods which can be used as follows:

Method 1 involves one stage and a single leaching agent which removes both the solvent and the removable filler.

Method 2 involves 2 stages and two different leaching agents (which need not be miscible) one for each stage. If the leaching agents are not miscible it may be desirable to dry the material between the two stages.

Method 3 involves one stage and a mixture of leaching agents.

Method 4 involves two stages in at least one of which the leaching agent is a mixture.

Method 5 involves one stage and a single leaching agent, the solvent leaching agent which removes the solvent but does not affect the permanent filler.

EXAMPLE 1

This example relates to the production of a microporous film and is an example of Method 1.

MIXTURE 1

This contains the following ingredients:

| Working material | |
|---|---|
| Polyurethane rubber (Estane X7) | 80 |
| Polyvinyl chloride - polyvinylidene copolymer (Breon 202) | 20 |
| Solvent | |
| Dimethyl formamide | 300 |
| Removable particulate filler | |
| Sodium chloride | 300 |

The working material is dissolved in the solvent. The removable particulate filler is then added and the mixture evenly mixed using a three roll mill or similar means to give a smooth cream of spreadable consistency which is degassed under vacuum with stirring. The mixture so formed is spread on to a temporary support such as a stainless steel conveyor and immersed in the one stage leaching agent, water, for sufficient time to remove substantially all of the solvent and the removable particulate filler, for example 1 to 3 hours.

The water may be cold or hot, but hot water speeds removal of the solvent and the removable particulate filler and may have some effect on the final pore size. The temperature of the water should not be such as to cause softening of the working material sufficient to result in collapse of the porous structure or reduction in porosity.

In this example the temperature of the water may be as high as 100° C.

The porous working material is then stripped from the support and washed to remove all traces of filler and dried at a temperature which should not be such as to cause softening of the working material sufficient to result in collapse of the porous structure or reduction in porosity. The drying temperature in this example is conveniently 60° C.

EXAMPLE 2

This relates to the production of a flexible microporous film or coating and is another example of Method 1.

MIXTURE 2

| | |
|---|---|
| Working material - a polyurethane | 100 |
| (a thermoplastic polyurethane granulate supplied by Elastollan Limited under the name Elastollan PP98AHK) | |
| Solvent - dimethyl formamide | 300 |
| Removable Particulate filler - | |
| sodium chloride | 300 |
| Pigment | 3 |

The mixture is prepared in the same way as in Example 1 the pigment being added with the removable particulate filler. The subsequent treatment is identical to Example 1 except that the resultant flexible microporous film is dried at 90° C.

EXAMPLE 3

This relates to the production of a rigid microporous film and is another example of Method 1.

MIXTURE 3

| | |
|---|---|
| Working material - polystyrene KLP | 200 |
| Solvent - acetone | 400 |
| Removable Particulate filler - | |
| sodium chloride | 600 |

The mixture is prepared and treated identically to Example 2 to produce a rigid microporous film.

EXAMPLE 4

This relates to the production of a flexible microporous film and is another example of Method 1.

MIXTURE 4

| | |
|---|---|
| Working material - a polyvinyl chloride - | |
| polyvinylidene copolymer (Breon 202) | 100 |
| Plasticizer for the working material - | |
| dioctyl sebacate | 50 |
| Solvent - dimethyl formamide | 400 |
| Removable Particulate filler - | |
| sodium chloride | 500 |

The mixture is prepared and treated identically to Example 2 to produce a flexible microporous film.

EXAMPLE 5

This relates to the production of a flexible microporous film and to an example of Method 2.

MIXTURE 5

| | |
|---|---|
| Working material - a polyurethane - | 100 |
| (a thermoplastic polyurethane supplied by B.F. Goodrich under the name Estane X7) | |
| Solvent - dimethyl formamide | 200 |
| Removable Particulate filler - | |
| sodium chloride | 300 |
| Pigment | 3 |

The mixture is formed in the same way as in Example 2, it is then knife coated on to release paper and leached at 25° C. in methanol (the solvent leaching agent) for 1-3 hours, to remove substantially all of the solvent and precipitate the working material, the body is then leached as in Example 1 with water (the removable filler leaching agent) for 1 to 3 hours to remove the removable particulate filler and then dried at 90° C. to produce a flexible microporous film.

EXAMPLE 6

This relates to the production of a flexible microporous film and is an example of Method 3.

MIXTURE 6

| | |
|---|---|
| Working material - a polyurethane (Estane X7) | 100 |
| Solvent - dimethyl formamide | 200 |
| Removable Particulate filler - | |
| sodium chloride | 300 |
| Pigment | 3 |

The mixture is prepared as in Example 2 and knife coated onto release paper and leached in a 50/50 by weight mixture of methanol and water (the mixed leaching agent) at 25° C. for 1 to 3 hours to remove substantially all of the solvent and the major portion of the removable particulate filler and dried at 90° C. to produce microporous film.

EXAMPLE 7

This relates to the production of a spongy microporous film and is an example of Method 4.

MIXTURE 7

| | |
|---|---|
| Working material - a polyvinyl chloride - | |
| polyvinylidene chloride copolymer (Breon 202) | 100 |
| Solvent - cyclohexanone (Sextone) | 400 |
| Removable Particulate filler - | |
| sodium chloride | 300 |
| Wetting agent - Manoxol TR | 3 |

The mixture is prepared as in Example 1 except that the wetting agent is dissolved in the solvent with the working material before the removable particulate filler is added. The mixture is knife coated on to release paper and leached in a 50/50 by weight mixture of methanol and water (the first stage mixed leaching agent) at 25° C. for 1 to 3 hours to remove substantially all of the solvent, and precipitate the working material, the body is then leached in water (the second stage filler leaching agent) as in Example 1 and dried at 90° C. to produce a spongy microporous film.

EXAMPLES 8, 9, 10 AND 11

These relate to the production of a fibrous base zone for use in the manufacture of a synthetic leather and are also further examples of method 1.

EXAMPLE 8 AND 9

MIXTURES 8 AND 9

|  | 8 | 9 |
|---|---|---|
| Working material and solvent - | | |
| a polyurethane (a thermoplastic polyurethane supplied by B.F. Goodrich Company under the name Estane X7) as a 20% by weight solution in dimethyl formamide | 200 | 200 |
| Vinyl chloride/Vinylidene chloride copolymer (a material supplied by British Geon Limited under the name Breon 202) as a 12% by weight solution in dimethyl formamide | 100 | 100 |
| Removable Particulate filler - | | |
| sodium chloride | 52 | 156 |
| Additional Solvent for the working material - | | |
| dimethyl formamide | 0 | 67 |

The mixtures are prepared as in Example 1.

The felt is mangled when immersed in the mixture 8 or 9 until it has become thoroughly impregnated and all the air in its interstices has been displaced. The impregnated felt is then passed through calender rolls to remove a proportion of the impregnant, two samples being produced resulting in ratios of working material to felt of 0.8 to 1 and 0.5 to 1 respectively.

The impregnated felt is then immediately immersed in water at 25° C. for some hours then leached at 85° C. for 1 to 3 hours and dried at 85° C. to produce a porous fibrous base zone.

EXAMPLE 10

MIXTURE 10

| Working material and solvent - | |
|---|---|
| a polyurethane (a thermoplastic polyurethane granulate supplied by Elastollan Limited under the name Elastollan PP75AHK) as a 20% by weight solution in dimethyl formamide. | 200 |
| Removable Particulate filler - | |
| sodium chloride | 40 |

The felt is treated exactly as in Examples 8 and 9 the ratio of working material to felt being 0.5 to 1.

EXAMPLE 11

MIXTURE 11

| Working material and solvent - | |
|---|---|
| a polyurethane (a polyurethane elastomer supplied by Monsanto Chemicals Limited under the name Texin 480A) as a 10% solution by weight in dimethyl formamide. | 400 |
| Removable Particulate filler - | |
| sodium chloride | 40 |

The felt is treated exactly as in Examples 8 and 9 except that the ratio of working material to felt is 0.3 to 1.

EXAMPLE 12

This relates to the production of a fibrous base zone for use in the manufacture of a synthetic leather and is an example of Method 5.

MIXTURE 12

| Working material and solvent - | |
|---|---|
| a polyurethane (a thermoplastic polyurethane granulate supplied by Elastollan Limited under the name Elastollan PP75AHK) as a 20% by weight solution in dimethyl formamide. | |
| Removable Particulate filler | none. |

The felt is impregnated by immersing it in Mixture 12 and then exposing the mixture containing the felt to a vacuum for a time sufficient to ensure that all the air is removed from the intersteces of the felt.

The impregnated felt is then passed through calender rolls to remove a proportion of the impregnant a sample being produced having a working material to felt ratio of 0.5 to 1.

The impregnated felt is then immediately immersed in water, the solvent leaching agent at 20° C. for some hours and then dried at 90° C. to produce a porous fibrous base zone.

It will be appreciated that a surface zone in the form of a film or coating as described in any one of Examples 1 to 7 could be formed on a suitably prepared surface of any suitable fibrous base zone to form a synthetic leather. Examples 8 to 12 provide suitable examples of fibrous base zones and a suitably prepared smooth surface is prepared by slitting the fibrous base zone parallel to its major plane, for example, with a band knife.

The microporous films produced by examples 1 to 7 have a thickness of the order of 10–20 thousandths of an inch, the materials produced by examples 8 to 12 have a thickness of the order of 40 thousandths of an inch.

The water vapour permeabilities (W.V.P.) of certain of the examples was measured and are given below. This property was measured at 38° C. with a calcium chloride dried atmosphere on one side of the film and a relative humidity of 100% on the other side of the film and is expressed as grams/sq. meter/24 hours.

Example 1 product W.V.P. 4460
Example 2 product W.V.P. 6640
Example 3 product W.V.P. 5600
Example 5 product W.V.P. 7500
Example 6 product W.V.P. 6760
Example 7 product W.V.P. 6480

The addition of at least 5 parts by weight of Manoxol N or TR or Silicon N 492 to any of the initial mixtures given in the examples results in a product having a useful degree of modification in its wettability or water repellancy properties.

The elastomeric polyurethanes used for making the preferred products of this invention are thermoplastic materials soluble in organic solvents such as dimethylformamide Materials of this type are well known in the art. For example the thermoplastic elastomeric polyurethanes sold under the name "Estane" by B. F. Goodrich, which are understood to have few, if any, chemical cross links and are believed to derive their properties primarily from hydrogen bonding forces rather than cross linkage are described in the article by Stetz and Smith in Rubber Age, May 1965, page 74; the typical stress-strain curves given in that article are reproduced here in FIG. 5. The material sold as Texin is another suitable elastomer. Very good results have been obtained with the polyester-based polyurethane elastomer known as Elastollan TN 61 EH 98 AK, made by reacting a hydroxyl-terminated polyester (e.g. of adipic acid and a glycol) of molecular weight about 2000 with butylene glycol and 4,4'-diphenylmethane di-isocyanate. According to the manufacturer's published specifications this material, when compression moulded to produce a non-porous structure such as a film or sheet (with further polymerization occurring, as is well known, during such moulding similar to the polymerization which occurs when the material is dissolved in a solvent such as dimethylformamide, probably due at least in part to further reaction occurring between previously unreacted hydroxyl and isocyanate groups which are present in the elastomeric material), has a Shore D hardness of $50\pm3$, a density of 1.23 g/cm$^3$; a tensile strength of over 450 Kg/cm$^3$, a modulus at 100% elongation of 120 Kg/cm$^3$, a modulus at 300% elongation of 180 Kg/cm$^3$, an elongation at break of 450% (all as measured by DIN53504); a "Stosselastizität" of over 30%; a tear strength (Streifen, DIN53507) of 50 Kg/cm; and a tear strength (Graves, DIN53515) of 90 Kg/cm.

By selecting certain lower ratios of filler to working material in conjunction with certain values of the ratio of working material to solvent (represented by a certain area of a graph relating these parameters) materials can be obtained having certain desirable properties different from those represented by other areas.

The materials corresponding to the selected area, have a structure which may be termed "cellular", comprising a microporous matrix having interconnected micropores providing permeability, and a number of much larger pores, which will be called macropores, which do not extend from face to face of the sheet and are of such size as to be visible to the unaided eye when a cross section of the sheet is viewed in normal daylight.

Although in general the "cellular" structure tends to be weaker and less tough at a given permeability than the "non-cellular" structure, this may not be important for certain applications, either because a lower strength may be tolerated or because a backing may be provided. On the other hand it tends to possess a cushion-like feel, or plump handle, which is particularly desirable for certain purposes, for example in upholstery materials, and in certain instances shoe upper materials.

Thus according to another aspect of the present invention a method of making a water vapour permeable flexible sheet material which includes forming a spreadable mixture comprising a solution of a film-forming flexible synthetic thermoplastic elastomeric polymeric working material in a solvent having distributed through it a removable solid filler ground to a narrow range of particle sizes, forming a ciontinuous layer of the mixture on a temporary backer to which the layer adheres, treating the layer on the backer with a coagulating liquid which is a non-solvent for the working material but is a solvent for the removable filler and is at least partially miscible with the solvent for the working material, so as to coagulate the working material into a sheet, and removing substantially all the solvent and the removable filler by washing the material with a coagulating liquid, drying the resultant water vapour permeable filexible sheet material, and stripping it from the temporary support, is characterised in that the ratio in parts by weight of filler to working material and the ratio in parts by weight of working material to solvent fall within the area defined by the closed figure A-B-C-A on the diagram, FIG. 1, of the accompanying drawings.

The washing of the material to remove the solvent and the filler may be merely immersing the material in coagulating liquid or may be washing with fresh coagulating liquid as continuing the treatment with the liquid used to achieve the actual coagulation.

Such materials are likely to have a "cellular" structure as defined above and this likelihood can be increased by suitable selection of the parameters of the thickness of the layer, the temperature at which the coagulation is carried out, and the filler particle size.

Preferably the ratio in parts by weight of filler to working material and the ratio in parts by weight of working material to solvent in the mixture fall within the area defined by the closed figure D-E-C-D on the diagram, FIG. 1, of the accompanying drawings.

Materials which have a high degree of cellularity in the sense of having a large number of macropores may be obtained by using a ratio in parts by weight of filler to working material of about 0.5:1 and a ratio in parts by weight of working material to solvent in the range 30:70 to 37.5:62.5.

Preferably the filler is ground so that more than 50% of the particles have a diameter within the range 4 to 20 microns. The average diameter of the particles may be in the range 10 to 14 microns and is preferably 13 microns; the standard deviation on either side of the average being 4.5 microns. This particle size will be referred to as $13\pm4.5$ microns (one standard deviation) in the rest of the specification. A suitable filler material is sodium chloride. Those particle sizes are as measured by means of a Photo-extinction Sedimentometer manufactured by Evans Electro Selenium Ltd. Model No. 41 used in accordance with the manufacturers' instructions based on papers by H. E. Rose in "Engineering" of March 31 and Apr. 14, 1950 and "Nature" of 1952 Volume 169 page 287.

The precise ratio of working material to solvent and of filler to working material at which macropores occur depends to some extent on the particle size of the filler, and if the particle size of the filler is reduced the area of ratios within which macropores are found to occur will be reduced. Thus the preferred average particle diameter is 13 microns. Preferably the mixtured used to form the layer is applied in a single coating step in such a way as to achieve a leached and dried porous product whose thickness is greater than 1 mm, and preferably is in the range 1.2 to 1.6 mm. Mixtures otherwise identical tend to produce less cellular materials when applied as thinner coatings. Preferred working materials are polyurethanes derived from polyesters, polyethers and polycaprolactones. Examples of polyester-based resins are those sold under the trade name ELASTOLLAN TN61 EH98AK and TEXIN. A suitable polyether-based resin is that sold as ELASTOLLAN TN63 PA9-8AK. A suitable caprolactone-based polyurethane is that sold as ELASTOLLAN TN65 EN98AK.

Solvents for the working material which may be employed include dimethyl formamide, dimethyl sulphoxide, N-methyl pyrrolidione and dimethyl acetamide, but the actual solvent chosen will depend on the working material employed. Thus for ELASTOLLAN TN61 EH98AK, dimethyl formamide is preferred.

Dimethyl formamide can be diluted with other cheaper solvents such as toluene and methyl ethyl ketone which although not solvents for the polyurethane on their own do not act as non solvents when mixed with dimethyl formamide.

A preferred working material is a thermoplastic elastomeric polyurethane derived from a polyester by reaction with a diol and a di-isocyanate, and in particular one in which the polyester comprises the condensation reaction product of adipic acid and ethylene glycol, the diol comprises 1,4-butylene glycol and the di-isocyanate comprises 4,4'-diphenylmethane di-isocyanate, and the isocyanates is used in very slight molar excess. Part of the ethylene glycol may be replaced by 1,4-butylene glycol.

A preferred coagulating liquid is water.

The temporary backer is preferably a sheet of porous synthetic plastics material, which may be formed by sinterinbg powdered thermoplastic polymer. The thermoplastic polymer may be a high density polyethylene. One particular such backer which has been found suitable is $0.067'' \pm 0.004''$ thick, has a permeability of $18 \pm 4$ cubic ft./min. air at a pressure of 8" static water gauge and weights 114 grams/sq. ft.

Desirably the backer has an ultimate tensile strength greater than 115 kg/cm.$^2$ and an elongation at break less than 25%.

An example of such a material is that sold under the trade name VYON. Such a material is formed by spreading an even layer of Ziegler high density polyethylene powder on a smooth metal surface and then placing the smooth metal surface and the layer in a suitably heated oven to cause the particles to sinter. The surface of the resultant sintered sheet which was in contact with the smooth metal surface is smoother than the other face and it is on this smoother face that the layer is formed.

In a preferred form of the invention the filler is sodium chloride, the working material comprises thermoplastic elastomeric polyurethane derived from a polyester by reaction with a diol and a di-isocyanate, the solvent cmprises dimethyl-formamide, and the mixture is formed by dissolving the polyurethane in the dimethyl formamide and then milling dried sodium chloride into the solution under conditions of low humidity until a homogeneous dispersion is obtained. Preferably the moisture content of the sodium chloride is not greater than 0.2–0.4% by weight and the milling conditions are not more humid than 50% RH at 25° C. In this form of the invention the layer is knife coated onto the backer as it passes around a roll the layer being applied to the backer between a doctor knife which is preferably vertical and an upstream inclined backing plate located before the doctor knife from the point of view of the movement of the backer.

It appears that if the moisture content of the sodium chloride is very much lower than 0.2–0.4%w e.g. 0.5%w or much greater e.g. 0.5%w the tendency for macropores to occur is increased. This tendency does not appear very clear cut and it is thus preferred to use salt with a moisture content of about 0.2–0.4% w and ratios in the area D-E-C-D. Similarly the results obtained under milling conditions more humid than 50% RH at 25° C. seem to indicate a tendency for increased occurrence of macropores with increased humidity but once again the tendency is not clear cut and it is thus preferred to use milling conditions of about 50% RH at 25° C. It is also desirable for the milling to be very thorough to ensure that the dispersion of the salt in the polyurethane solution is homogeneous since although formulations which are not sufficiently milled have increased numbers of macropores they are of less regular size and distribution.

Increasing the coagulation temperature for example to 80° C. also appears to increase the numbers of macropores but once again their size and distribution is less regular than when lower coagulating temperatures are used with ratios in the range D-E-C-D. Thus preferably the coagulation is carried out by immersing the layer on the backer coated face downwards in water at 20° C. Conveniently the material is immersed in the cold, for example at 20° C., in the coagulating liquid until insufficient solvent remains to cause collapse of the porous structure on heating and then the filler is removed to an adequate level by mangling the material in heated coagulating liquid, for example at 60° C., which is passed in countercurrent to the material.

It will be noted that the lower limit of the ratio of working material to solvent in the area referred to above is set at about 25:75. Thus if this ratio is further reduced, that is to say if the proportion of solvent is increased, the effect is somewhat similar to that of increasing the ratio of filler to working material above 3:1 in giving a more open and weaker structure. As regards the upper limit of this ratio, this is set by the practical question of providing sufficient solvent to form a mixture capable of being formed in a continuous layer.

Certain examples, 13 to 27, will now be given to illustrate this aspect of the invention with reference to the accompanying drawings in which FIG. 1 is a graph with ratios in parts by weight of working material to solvent expressed as percentages of working material as absissae, and the corresponding ratios in parts by weight of filler to working material as ordinates; these "cellular" examples are represented by circles; and FIG. 2 is a flow diagram of the process for the preparation of a single layer or substrate material.

EXAMPLE 13

General Description of the Process

Referring to FIG. 2 the main stages of the process are numbered 32 to 80. There are two ancillary stages, those of grinding the sodium chloride to a narrow range of fine particle sizes, stage 20, and manufacturing the backer, stage 25.

In general terms the main stage of the process of this example consists of preparing a substrate paste containing a solution of a polyester based polyurethane dissolved in dimethyl formamide, and finely divided sodium chloride. These are stages 32 and 35. The substrate paste is used to form the materials in accordance with the present invention which find particular uses as substrates for man-made leather-like materials. (Optional additional coatings may be formed on the material in accordance with the present invention, or it may be provided merely with a surface finish).

A layer of the substrate paste is spread on the backer. This is stage 40.

The coated backer, held under suitable tension throughout this stage of the process, is smoothly immersed, coated face down, in water and washed with water (for example at 20° C.) until the polyurethane has all been precipitated out of solution and all the dimethyl formamide has been removed. These are stages 50 and 55. The remainder of the sodium chloride is then removed by leaching with water heated (for example to 60° C.) and the material dried with the layer uppermost, care being taken that the heating does not warp the backer. Twenty minutes in an oven at 120° C. is suitable. These are stages 60 and 65.

After being dried it is carefully stripped from the backer. This is stage 70. It may be easier to do this whilst the material is still hot. This process imparts a fibrous or flesh surface appearance to the surface which was in adherence with the backer.

The backer is then treated to enable it to be reused if possible and returned to stage 25 of the process for reuse or recovery.

The material is then inspected and tested, stage 75, and if it comes up to specification may optionally be given further coatings as mentioned above and/or a surface finishing treatment by spraying with dimethyl formamide and drying. This is stage 80. This imparts a high quality calf grain appearance to the surface of the material. It may also be given other optional treatments mentioned below.

DETAILED DESCRIPTION OF THE PROCESS

Stage 20 Grinding the Filler

Figure 1:
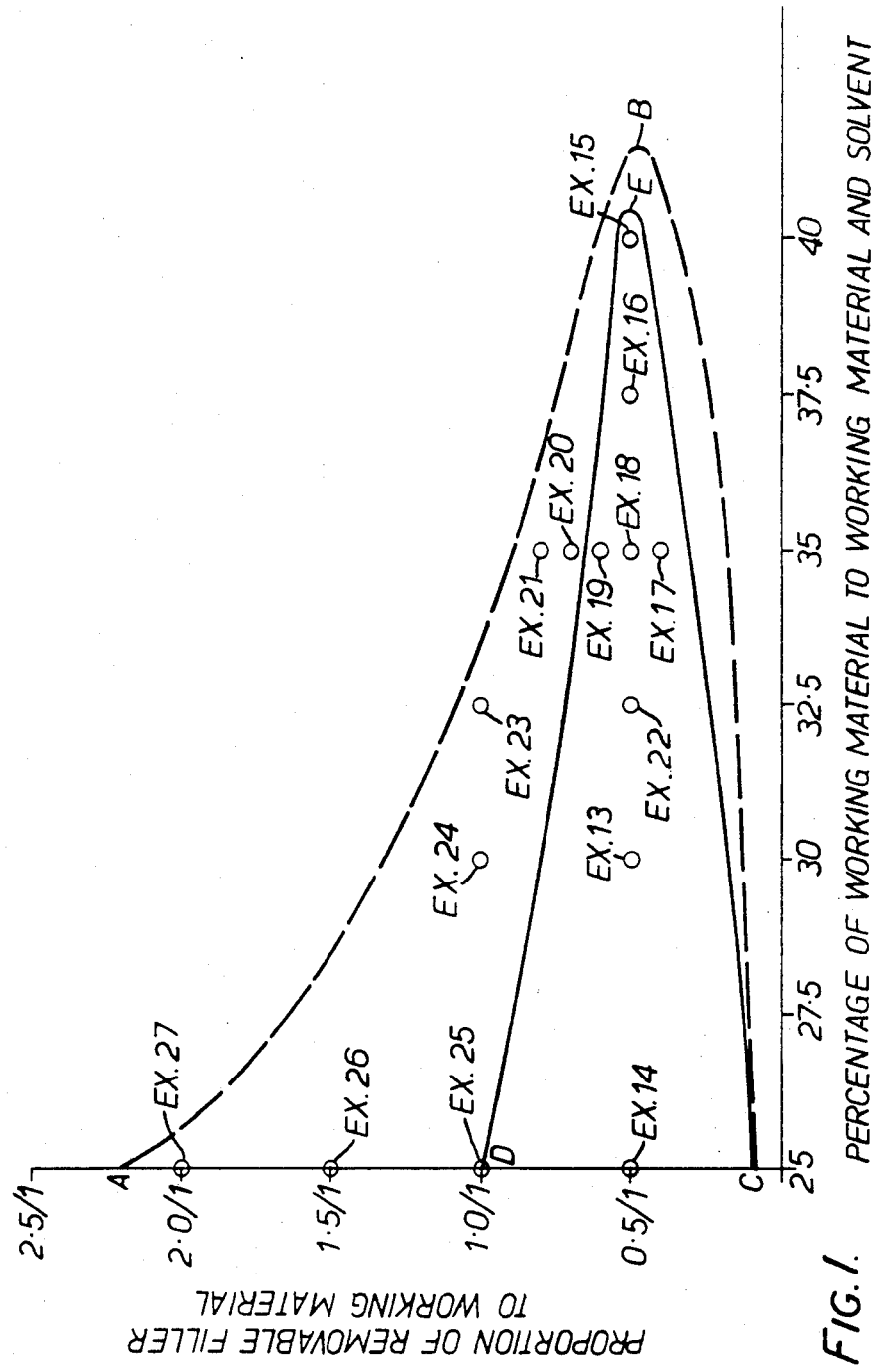

Satisfactory results are obtained when the majority of the particles are between 4 and 20 microns in diameter the preferred average particle diameter being $13\pm4.5$ microns (one standard deviation). The particle size of the salt is measured on a Photo-extinction Sedimentometer manufactured by Evans Electro Selenium Limited, Model No. 41 used in accordance with the manufacturer's instructions based on papers by H. E. Rose in "Engineering" of March 31 and Apr. 14, 1950 and "Nature" of 1952 Volume 169 page 287.

Care must be taken to ensure that the particles in the test suspension have not aggolomerated and this can be achieving by applying ultrasonic vibrations to the test suspension, these of course must be such as not to break up the individual particles but merely any agglomerates. The grinding is performed by re-circulating the sodium chloride between a grinder producing particles somewhat on the coarse side and a classifier which separates the particles that are too coarse and returns them to the grinder. Typically approximately 50% of the total mass is returned for regrinding. The grinder may be of the type comprising a pair of co-axial discs which can be rotated at different speeds or in opposite directions, each disc having concentric rings of pegs projecting from it and lying between the rings of pegs of the companion disc.

The material which is ground consists of sodium chloride crystals having a moisture content not in excess of 0.2–0.4% w to which are added between 0.4 and 0.7% w of a co-precipitated lime and silica anti-caking agent, for example that sold as Microcal 160 (trade mark) by Joseph Crosfields Ltd. The ground sodium chloride is sealed in cans and stored under dry conditions so that the moisture content of the ground salt does not exceed 0.2–0.4% w. and is preferably about that value.

Stage 25 Manufacturing the Backer

The temporary backer is a sheet of porous synthetic plastics material, formed by spreading an even layer of Ziegler high density polyethylene powder on a smooth metal surface and then placing the smooth metal surface and the layer in a suitably heated oven to cause the particles to sinter. The surface of the resultant sintered sheet which was in contact with the smooth metal surface is smoother than the other face and it is on this smoother face that the layer is formed.

The material is 22" wide, $0.067''\pm0.004''$ thick, has a permeability of $18\pm4$ cubic ft. air/minute at a pressure of 8" static water gauge and weighs 114 gram/ft.$^2$.

Stages 30 to 36 Preparing the Substrate Paste

The working material from which the man-made leather-like water vapour permeable flexible sheet material is made is a polyester based polyurethane which is made as follows.

The starting material is a linear polyester containing hydroxyl groups which is made from adipic acid and ethylene glycol, which has a molecular weight of approximately 2,000 a hydroxyl index around 50 and an acid number of 1. 1,000 g. of this polyester is heated to approximately 120° C. with 90 g. 1,4-butylene glycol, both re-agents having been adequately dessicated beforehand. 400 g. of solid 4,4'-diphenylmethane diisocyanate is added to the heated mixture with vigorous stirring, which is continued until the solid has dissolved, the temperature reaching about 100° C. After about two minutes the liquid is poured on to plates preheated to between 110° C. and 130° C. After about ten minutes the mass is stripped from the plates, allowed to cool to room temperature, and granulated in a conventional granulating machine. This material has a Shore hardness of 98 on the A scale at 25° C. A 10% w. solution in dimethyl formamide has a viscosity of the order of 15 to 30centipoise at 25° C.

In a modification of this material part of the ethylene glycol is replaced by 1,4-butylene glycol so that the basic polyester is in fact a copolymer of two diols.

The material may also contain conventional stabilisers.

Figure 2:
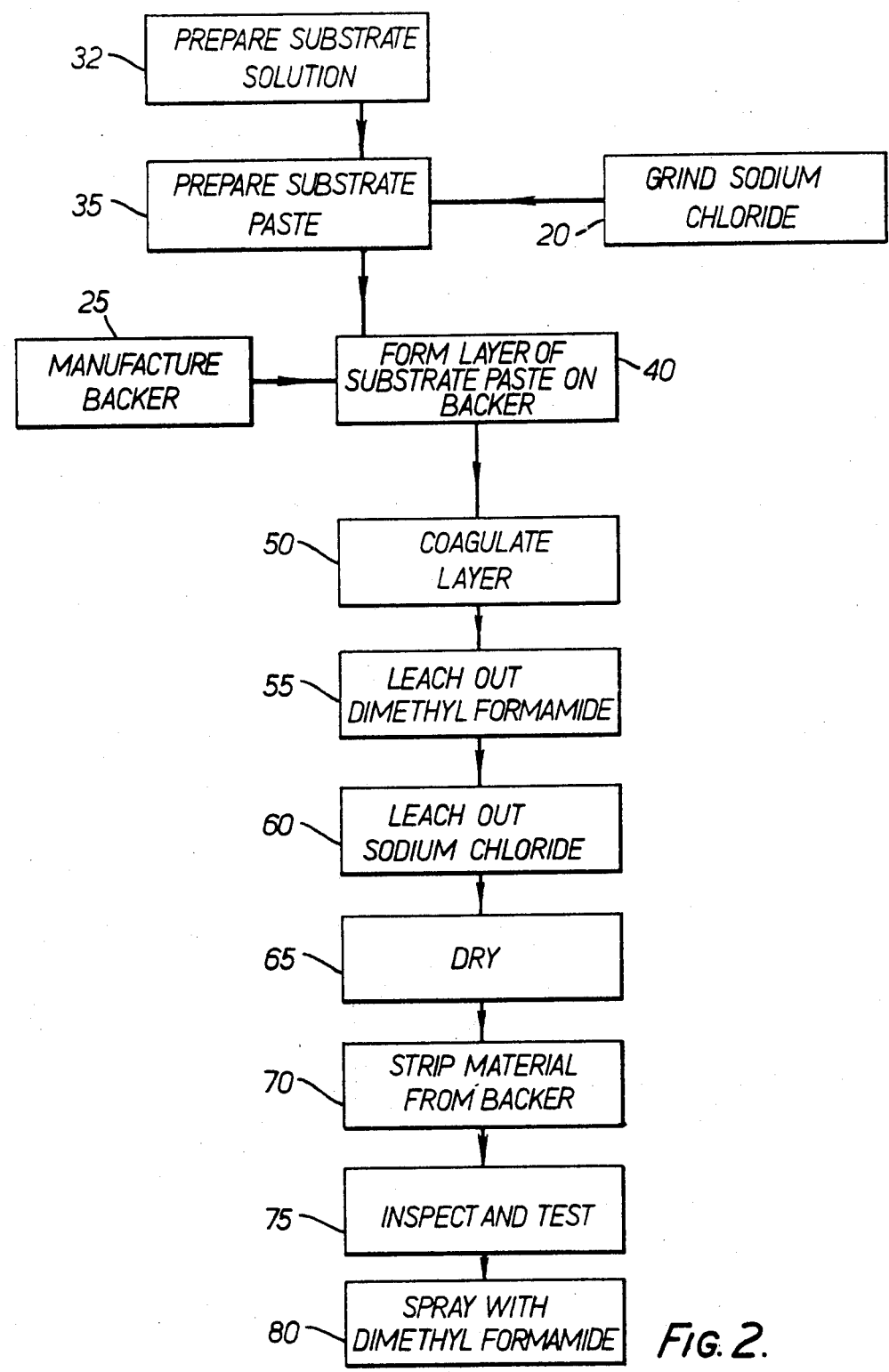

Stage 32 of FIG. 2, preparing the substrate solution, is carried out by weighing out 3 parts by weight of this polymer and dissolving this in 7 parts by weight of dry dimethyl formamide (less than 0.01% of moisture, supplied by I.C.I. Ltd. in accordance with their specification for dry dimethyl formamide) in a vertical mixer with a high rate of shear, e.g. a Silverson mixer. Care must be taken to keep the temperature below 40° C. during mixing or degradation of the polyurethane is liable to occur. The substrate solution is stored under dry conditions.

Care must be taken when handling dimethyl formamide solutions since the vapour is toxic and also hydroscopic. Thus when possible the mixing stages are enclosed and are kept at low humidity ideally less than 50% RH at 25° C.

Stage 35, preparing the substrate paste, is carried out as follows. 100 parts by weight of filtered substrate solution are placed in a paddle type mixer and 15 parts by weight of ground salt taken from sealed cans is added after being sieved through a 60 mesh British Standard screen in a vibratory sleeve.

This is mixed in a paddle type mixer and then milled on a Torrance triple roll mill to produce a homogenous dispersion. Two passes through the mill produce a dispersion which, when tested with Hegman gauge, is indicated by a reading of 6.5 to 7 to have present on particles greater than 14 microns in diameter. This dispersion, the substrate paste, is stored under dry conditions.

To summarise the substrate paste has the following composition:

Polyurethane (15–30 centipoise at 25° C.)
30 parts by weight
Ground sodium chloride (average particle diameter 13±4.5 microns (one standard deviation))
15 parts by weight
Dimethyl formamide
70 parts by weight

Stage 40 Forming the Layer

The backer which has been stored under dry conditions is passed round an 18" diameter ground steel spreading roll underneath a doctor knife blade and down under a guide roll into a coagulating tank.

The substrate paste is mixed to eliminate any settling of the sodium chloride and de-aired under vacuum in a mixer and then supplied to the doctor knife.

This is set to provide a gap setting between the backer and the blade such that a 0.090" wet coating 18" wide is produced. This layer when leached and dried weighs 450 grams/m$^2$ and is 0.050" or 1.2 mm thick.

Stage 50 coagulating the Layer

As mentioned above the coated backer enters the tank by passing under a guide. Located along the inside of the side walls of the tank are horizontal channels through which slide the uncoated edges of the 22" wide backer. The backer emerges out of the tank around a guide roll and through a constant speed wind up arrangement driven by a variable speed motor and gearing and is fed on to a wind up roll.

The backer with the layer on it is run at 4 feet/minute into the tank of water maintained at 20° C. with, it will be appreciated, its coated face downwards. The layer is thus immersed within about half a minute of being formed. The entry to the water is done as smoothly as possible so as to avoid the formation of ripples on the surface of the layer.

Alternatively the coating may be passed through an atomised spray of water just before it is immersed.

The channels and the tension in the backer hold it about 2" below the surface of the water. Fresh water is pumped into the tank from both ends and the level is maintained by an overflow at the centre of the tank. The water is maintained at 20° C. by a steam jacket at the bottom of the tank and plastic balls floating on and covering the surface of the water.

The material is passed into the 60 ft. long tank and the total immersion time is 45 minutes. This is to allow the microporous polyurethane which precipitates out of solution in a few minutes to harden off. The material is kept with the coated surface down during this stage to prevent any air in the backer rising or being forced through the polyurethane layer thus forming bubbles or voids.

The layer of polyurethane contracts during precipitation but the backer is tensioned and is such that warping and shrinkage in length of breadth does not occur to any disadvantageous degree.

Stage 55, leaching out the dimethyl formamide, is carried out as follows. The material is wound up on a roll which is transferred to a static cold water holding tank where the coils of the roll are allowed to loosen slightly. The material is held in this tank until the amount of dimethyl formamide left in the material is not sufficient to cause collapse of the porous structure on heating. About two hours are required for this stage.

Stage 60 Leaching Out the Sodium Chloride

The material from the holding tank is passed in loops and through mangles with loads of about 300 lbs through a series of leaching tanks arranged so that the water is fed in countercurrent to the material. This takes about four hours. The water is heated at 60° C. This removes sufficient sodium chloride to result in a satisfactory product.

Stage 65, drying the material, is carried out by passing the wet material coated side uppermost through an oven at 120° C. in twenty minutes. Any salt remaining tends to be deposited out in the backer rather than in the layer and thus does not interfere with the solvent spraying, stage 80.

This temperature and time in the oven does not cause the backer to warp.

Stage 70 Stripping the Material from the Backer

The material is separated from the backer, taken round a roll past circular edge trimming knives and wound up on a constant speed wind up roll, driven via a friction clutch so as to prevent undue stretching of the material. The backer is returned to the sintering plant for recovery or re-use and the material goes to Stage 75, inspection and testing. The material may then be given further coatings and/or be spray finished as mentioned above.

The material produced by this process after spraying with the solvent has the appearance of a high grade calf grain leather and this man-made leather-like material can be used as a replacement for such materials.

The sheet was 1.2 mm. thick and was "cellular".

The water vapour permeability of the product was measured by the dessicant method and by the control dish method (as described below) figures of 935 g/m$^2$/24 hours and 94.9 mm. respectively being obtained. The product had a plump handle making it particularly suitable for use as an upholstery material.

EXAMPLE 14

The procedure of Example 13 was repeated for a formulation having a working material to solvent ratio of 25:75 and a filler to working material ratio of ½:1.

A coagulating temperature of 20° C. was used and the sheet when dried was 1.59 mm. thick and was "cellular".

The water vapour permeability of the product was measured by the dessicant and the control dish methods, figures of 2950 g/m$^2$/24 hours and 15.5 mm. being obtained. The product has a plump handle making it particularly suitable for use as an upholstery material.

The dessicant method referred to above for determining water vapor permeability is as described in BSS 3177/1959 but is carried out at 38° C. with a nominal humidity gradient of 100% relative humidity.

The control dish method of measuring water vapour permeability is described in The Textile Research Journal Volume XXV No. 3 pp 197 to 205, March 1966, and in D.R.M.L. No. 121-3, (P.C.C. Project No. D 49-75-70-12) issued by the Defence Research Medical Laboratories P.O. Box 62 Postal Station K Toronto Canada dated January, 1959, on The Measurement of the permeability of Clothing Materials to Water Vapour.

EXAMPLES 15 TO 27

The procedure of Example 1 was followed but with the following different formulations:

| Example | filler:working material ratio | working material: solvent ratio |
|---|---|---|
| 15 | 0.5:1 | 40:60 |
| 16 | 0.5:1 | 37.5:62.5 |
| 17 | 0.4:1 | 35:65 |
| 18 | 0.5:1 | 35:65 |
| 19 | 0.6:1 | 35:65 |
| 20 | 0.7:1 | 35:65 |
| 21 | 0.8:1 | 35:65 |
| 22 | 0.5:1 | 32.5:67.5 |
| 23 | 1.0:1 | 32.5:67.5 |
| 24 | 1.0:1 | 30:70 |
| 25 | 1.0:1 | 25:75 |
| 26 | 1.5:1 | 25:75 |
| 27 | 2.0:1 | 25:75 |

Alternatively or in addition the material can be lacquered.

The material can alternatively be supplied by known techniques with one or more additional coatings, which may then be spray finished and/or lacquered.

In certain respects improved microporous materials are obtained by selecting a ratio of filler to working material less than 3 to 1. In particular the toughness or wear resistance and resistance to tear propagation tend to fall off with increase of the proportion of filler.

On the other hand it is found that reduction of the filler ratio beyond a certain point, dependent on the ratio of working material to solvent, results in a material having a different structure. This structure, which may be termed "cellular" as mentioned above comprises a microporous matrix having interconnected micropores providing permeability, and a number of much larger pores, which will be called macropores, which do not extend from face to face of the sheet and are of such size as to be visible to the unaided eye when a cross section of the sheet is viewed in normal daylight. In the normal structure, which may be termed "non-cellular", on the other hand, there are no macropores and the microporous structure is more nearly homogeneous.

In general the "cellular" structure tends to be weaker and less tough than the non-cellular structure, and hence for purposes such as man-made leather-like materials for shoe uppers in which strength and toughness are required, it may be desirable to avoid the "cellular" structure. Thus the selection of materials having a ratio of filler to working materials of less than 3:1, but above the area in which the "cellular" structure occurs, is believed to result in a particularly favourable combination of properties, notably toughness or wear resistance and water vapour permeability.

Indeed the production of a sufficiently tough and strong water vapour permeable microporous synthetic polymeric material may make it practicable to eliminate the necessity for employing a lining or backing or permanent support of woven or fibrous material in order to impart the necessary strength to an artificial leather, thereby effecting considerable economy in addition to eliminating certain disadvantages which occur when a fibrous support is used.

This proposal also overcomes a difficulty experienced with certain prior proposals for shoe upper materials, which use fibrous supports made from felts or fleeces consolidated by needle punching, that the resultant variations in density in the felt show up as surface irregularities when the material derived from them is stretched. This problem is aptly referred to as the "orange peel effect" and does not occur with materials using the fleeceless "non-cellular" material of the present invention.

Figure 3:
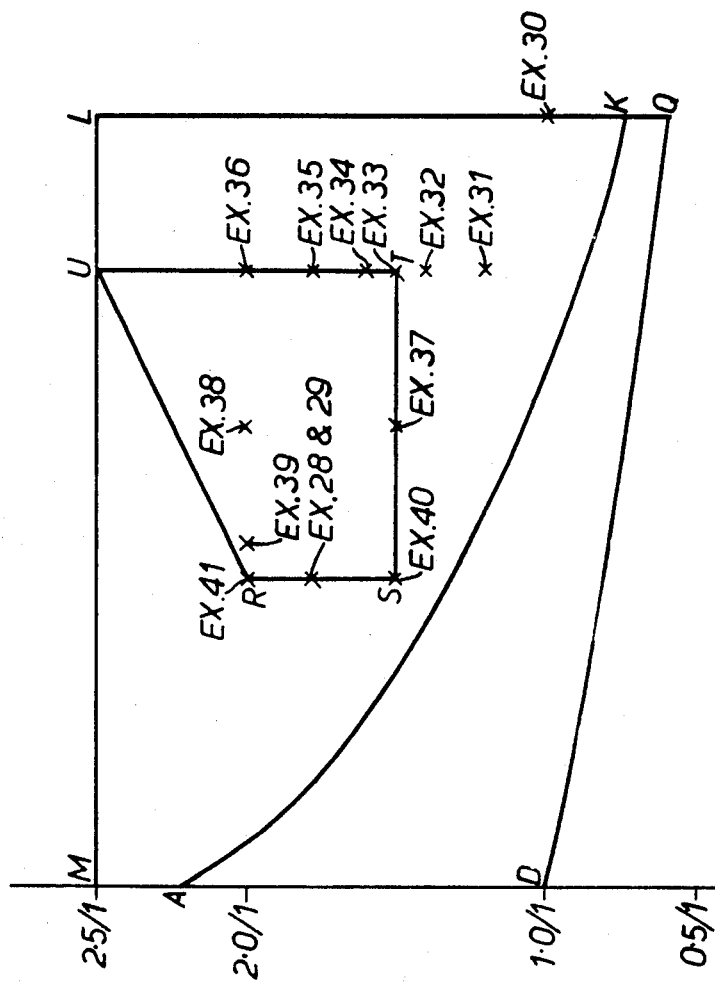

Thus according to another aspect of the present invention a method of making a water vapour permeable flexible sheet material which includes forming a spreadable mixture comprising a solution of a film forming flexible synthetic polymeric thermoplastic elastomeric working material in a solvent having distributed through it a removable solid filler ground to a narrow range of particle sizes, forming a continuous layer of the mixture on a temporary backer to which the layer adheres, treating the layer on the backer with a coagulating liquid which is a non-solvent for the working material but is a solvent for the removable filler and is at least partly miscible with the solvent for the working material, so as to coagulate the working material into a sheet, and removing substantially all the solvent and the removable filler by washing the material with a coagulating liquid, drying the resultant water vapour permeable flexible sheet material, and stripping it from the backer, is characterised in that the ratio in parts by weight of filler to working material and the ratio in parts by weight of working material to solvent in the mixture fall within the area defined by the closed figure A-K-L-M-A of the diagram, FIG. 3, of the accompanying drawings but above the line A-K.

The washing of the material to remove the solvent and the filler may be merely immersing the material in coagulating liquid or may be washing with fresh coagulating liquid or continuing the treatment with the liquid used to achieve the actual coagulation.

Such materials are likely to have a "non-cellular" structure as defined above and this likelihood can be increased by suitable selection of the parameters of the thickness of the layer, the temperature at which coagulation is carried out, and the filler particle size.

However, apart from the question whether or not the material contains macropores other factors may be of importance, for example adequate water vapour permeability, and especially strength including resistance to wear and to tearing, and ease of working, especially ease of spreading.

With higher ratios of working material to solvent the viscosity increases to a point at which spreading of the layer becomes difficult; on the contrary if this ratio is unduly reduced the strength is liable to suffer.

With higher ratios of filler to working material (within the broad area covered by the invention) permeability should generally meet requirements and strength tends to be the critical factor, and hence if the proportion of filler is increased the proportion of working material to solvent should also be increased. On the other hand at lower proportions of filler to working material the permeability may still be sufficient to meet requirements, and in addition the question of strength presents less difficulty, so that as the proportion of working material to solvent is increased adequate strength can be maintained without fear of macropores occurring over a range of proportions of filler to working material.

Effecting a balance between all these considerations it is preferred to use ratios in parts by weight of filler to working material and ratios in parts by weight of working material to solvent in the mixture falling within the area defined by the closed figure R-S-T-U-R in the diagram, FIG. 3, of the accompanying drawings.

Preferably the ratio in parts by weight of filler to working material is in the range 1.5 to 1 to 2.0 to 1 and the ratio in parts by weight of working material to solvent is in the range 30:70 to 35:65. Preferably the filler is ground so that more than 50% of the particles have diameters in the range 4 to 20 microns. The average diameter of the particles may be in the range 10 to 14 microns and is preferably 13 microns; the standard deviation on either side of the average being 4.5 microns. This particle size will be referred to as 13±4.5 microns (one standard deviation) in the rest of the specification. A suitable macropores to occur is increased. It is thus preferred to use salt with a moisture content of about 0.2–0.4% w. Similarly the results obtained under milling conditions more humid than 50% RH at 25° C. seem to indicate a tendency for increased occurrence of macropores with increased humidity. It is thus preferred to use milling conditions of about 50% RH at 25° C. It is also desirable for the milling to be very thorough to ensure that the dispersion of the salt in the polyurethane solution is homogeneous since formulations which are not sufficiently milled are liable to have macropores.

Provided the ratios fall within the preferred area R-S-T-U-R macropores are unlikely to be produced. However, in the case of the particle sizes at the low end of the range quoted above, the tendency of the sodium chloride to absorb moisture is increased and care must be taken to ensure that the preferred moisture content of 0.2–0.4% w for the sodium chloride mentioned above is not exceeded and the preferred milling conditions set out above are fulfilled. In addition the coagulation temperature should be kept down if macropores are to be avoided.

Preferably the mixture used to form the layer is applied in a single coating step in such a way as to achieve a leached and dried microporous product whose thickness is greater than 1 mm, and preferably is in the range 1.0 to 1.2 mm.

It is believed that material having parameters which fall within the particular areas A-K-L-M-A and especially R-S-T-U-R have desirable properties that are not possessed by materials in which the content of filler is either greater or less. Broadly speaking if the proportion of filler is increased the structure of the material may be regarded as becoming more open so that the vapour permeability increases but correspondingly the strength or toughness decreases. Conversely if the proportion of filler is reduced the point is reached at which the structure becomes "cellular", and this again reduces the strength or toughness or wear resistance or resistance to tear propagation of the material, although in this case in general there is no notable increase in water vapour permeability but a decrease in resistance to liquid water penetration.

It will be noted that the lower limit of the ratio of working material to solvent in the selected area referred to above is set at about 25:75. Thus if this ratio is further reduced, that is to say if the proportion of solvent is increased, the effect is somewhat similar to that of increasing the ratio of filler to working material above 3:1 in giving a more open and weaker structure. As regards the upper limit of this ratio, this is set by the practical question of providing sufficient solvent to form a spreadable mixture capable of being formed into a continuous layer.

In addition to the parameters of working material concentration, proportion of filler, and filler particle size which may have a critical influence on the properties of the product, there are other parameters which exert a less marked or distinguishable influence. For example, the spreading gap employed when forming the layer of working material on the temporary support, apart from determining the thickness of the product, also influences the permeability and tear strength of the product. In general it was found that, for "non-cellular" materials the tear strength increased with increase of the spreading gap while the permeability decreased.

Certain examples, 28–41, will now be given to illustrate this aspect of the invention with reference to FIG. 3.

FIG. 3 is a graph with ratios in parts by weight of working material to solvent expressed as percentages of working material as abscissae, and the corresponding ratios in parts by weight of filler to working material as ordinates; these "non-cellular" samples are represented by crosses.

EXAMPLE 28

Example 13 was repeated except that the paste formulation was as follows:
  Polyurethane (15–30 centipoise at 25° C.)
    30 parts by weight
  Ground sodium chloride (average particle diameter
    13±4.5 microns (one standard deviation))
    53.4 parts by weight
  Dimethyl formamide
    70 parts by weight This paste had a viscosity of the order of $1.5 \times 10^6$ centipoise at 25° C. This layer when leached and dried weighs 450 grams/m.$^2$ and is 0.050" or 1.2 mm. thick.

The material produced by this process, after spraying with the solvent, has the appearance of a high grade calf grain leather and this man-made leather-like material can be used as a replacement for such materials, for example as a men's shoe upper material.

Photomicrographs indicate that it has a fine even interconnecting pore structure.

EXAMPLE 29

The procedure of Example 28 was followed except that the coagulating temperature was 40° C. The sheet when dried was 1.2 mm thick and was "non-cellular". The water vapour permeability of the product was measured by the dessicant method*, a figure of 4000 g/m$^2$/24 hours being obtained. The product showed satisfactory wear properties. *The dessicant method for determining water vapour permeability is as described in BSS 3177/1959 but carried out at 38° C. with a nominal humidity gradient of 100% relative humidity.

EXAMPLES 30 TO 41

The procedure of Example 28 was followed but with the following different formulations.

| Example | filler:working material ratio | working material: solvent ratio |
|---|---|---|
| 30 | 1:1 | 37.5:62.5 |
| 31 | 1.2:1 | 35:65 |
| 32 | 1.4:1 | 35:65 |
| 33 | 1.5:1 | 35:65 |
| 34 | 1.6:1 | 35:65 |
| 35 | 1.78:1 | 35:65 |
| 36 | 2.0:1 | 35:65 |

| Example | filler:working material ratio | working material: solvent ratio |
|---|---|---|
| 37 | 1.5:1 | 32.5:67.5 |
| 38 | 2.0:1 | 32.5:67.5 |

| Example | filler:working material ratio | working material: solvent ratio |
|---|---|---|
| 39 | 2.0:1 | 30.6:69.4 |
| 40 | 1.5:1 | 30:70 |
| 41 | 2.0:1 | 30:70 |

Alternatively or in addition the material can be lacquered.

The material can alternatively be supplied by known techniques with one or more additional coatings, which may then be spray finished and/or lacquered.

What I claims as my invention and desire to secure by Letters Patent is:

1. A method of making a macroporous polymeric plastics material which comprises
    (a) forming a mixture of spreadable consistency comprising a solution of elastomeric polyurethane in water-miscible organic solvent, the said solution having evenly distributed through its microscopic particles of water-soluble inorganic salt,
    (b) shaping the mixture into a layer by spreading said mixture on a temporary support, and
    (c) solidifying said polyurethane on said support by the action of liquid aqueous non-solvent therefor, which is miscible with the organic solvent, the leaching out said microscopic particles of the salt to leave the elastomeric polyurethane in a microporous solid form, as a layer, the weight ratio of salt to polyurethane being up to about 6:1,
    said process including the step of stripping the solidified layer from said support.
2. Process as in claim 1 in which said solvent comprises tetrahydrofuran.
3. Process as in claim 1 in which said solvent comprises N-methyl pyrrolidone.
4. Process as in claim 1 in which said solvent comprises dimethyl sulphoxide.
5. Process as in claim 1 in which said solution has evenly distributed therethrough microscopic particles of sodium chloride and said solidifying is effected by the action of liquid water on a layer of said mixture on a support.
6. Process as in claim 5 in which the weight ratio of salt to polyurethane is in the range of 3:1 to 6:1.
7. Process as in claim 9 in which said weight ratio is 3:1.
8. Process as in claim 6 in which said solvent comprises dimethylformamide.
9. Process as in claim 7 in which said solvent comprises dimethylformamide.
10. A method of making a microporous polymeric plastics material which comprises
    (a) forming a mixture of spreadable consistency comprising a solution of elastomeric polyurethane in water-miscible organic solvent, the said solution having evenly distributed through its microscopic particles of water-soluble inorganic salt,
    (b) shaping the mixture into a layer by spreading said mixture on a temporary support,
    (c) solidifying said polyurethane by the action of aqueous non-solvent therefor, which is miscible with the organic solvent, the leaching out said microscopic particles of the salt to leave the elastomeric polyurethane in a microporous solid form, as a layer about 10 to 20 thousandths of an inch thick, the weight ratio of salt to polyurethane being up to about 6:1,
    said process including the step of stripping the solidified layer from said support.
11. Process as in claim 10 in which said mixture is of dough-like consistency, the weight ratio of salt to polyurethane is 3:1 and said solvent comprises dimethyl formamide.
12. Product of the process of claim 10.
13. Product of the process of claim 11.

* * * * *

UNITED STATES PATENT OFFICE
CERTIFICATE OF CORRECTION

PATENT NO. : 4,242,464
DATED : December 30, 1980
INVENTOR(S) : David L. Boutle

It is certified that error appears in the above-identified patent and that said Letters Patent are hereby corrected as shown below:

On the title page, Assignee should read:
-- [73] Assignee: Porvair Limited, Norfolk, England --.

Signed and Sealed this

Ninth Day of June 1981

[SEAL]

Attest:

RENE D. TEGTMEYER

Attesting Officer — Acting Commissioner of Patents and Trademarks